United States Patent
Loke et al.

(10) Patent No.: US 9,244,875 B1
(45) Date of Patent: Jan. 26, 2016

(54) SYSTEMS AND METHODS FOR TRANSITION-MINIMIZED DATA BUS INVERSION

(71) Applicant: QUALCOMM Incorporated, San Diego, CA (US)

(72) Inventors: Alvin Leng Sun Loke, San Diego, CA (US); Tin Tin Wee, San Diego, CA (US); Thomas Clark Bryan, San Diego, CA (US)

(73) Assignee: QUALCOMM Incorporated, San Diego (*) Notice: Subject to any disclaimer, the term of this patent is extended or adjusted under 35 U.S.C. 154(b) by 0 days.

(21) Appl. No.: 14/335,712

(22) Filed: Jul. 18, 2014

(51) Int. Cl.
| *G06F 13/00* | (2006.01) |
| *G06F 13/40* | (2006.01) |
| *G06F 13/42* | (2006.01) |

(52) U.S. Cl.
CPC ........ *G06F 13/4072* (2013.01); *G06F 13/4208* (2013.01)

(58) Field of Classification Search
CPC .............. G11C 7/1006; G11C 7/1048; G11C 11/4096; G11C 7/1051; G11C 2029/3602
USPC ............... 710/100, 104, 105, 305; 341/51, 55
See application file for complete search history.

(56) References Cited

U.S. PATENT DOCUMENTS

| 6,584,526 | B1 * | 6/2003 | Bogin | G06F 11/10 710/124 |
|---|---|---|---|---|
| 7,082,489 | B2 * | 7/2006 | Yeh | G06F 13/1668 710/106 |
| 7,400,541 | B2 * | 7/2008 | Jang | G11C 7/1006 326/26 |
| 7,411,840 | B2 * | 8/2008 | Gaskins | G06F 13/4072 365/189.07 |
| 7,501,963 | B1 * | 3/2009 | Hollis | G11C 7/1006 341/50 |
| 7,522,073 | B1 * | 4/2009 | Kao | H03M 5/145 341/55 |
| 7,616,133 | B2 * | 11/2009 | Hollis | G06F 13/4234 341/51 |
| 7,990,777 | B2 * | 8/2011 | Rha | G11C 7/1006 365/189.07 |
| 2002/0156953 | A1 | 10/2002 | Beiley | |
| 2004/0068594 | A1 * | 4/2004 | Asaro et al. | 710/104 |
| 2007/0038789 | A1 * | 2/2007 | Macri | H03L 7/07 710/105 |
| 2013/0159584 | A1 * | 6/2013 | Nygren | G06F 13/4273 710/305 |
| 2014/0071743 | A1 | 3/2014 | Kim | |

OTHER PUBLICATIONS

Hollis T.M., et al., "Data Bus Inversion in High-Speed Memory Applications," IEEE Transactions on Circuits and Systems—II: Express Briefs, Apr. 2009, vol. 56 (4), pp. 300-304.
Liu C.C., et al., "High Performance Integrated Fan-Out Wafer Level Packaging (InFO-WLP): Technology and System Integration," 978-1-4673-3/12 © 2012, IEEE, pp. IEDM 12-323 to IEDM 12-326.

* cited by examiner

*Primary Examiner* — Linh Nguyen
(74) *Attorney, Agent, or Firm* — Haynes and Boone LLP

(57) ABSTRACT

Circuits and methods for Data Bus Inversion (DBI) are provided. In one example, the immediately previous value of the DBI bit affects the next value of the DBI bit. Specifically, in some instances, the value of the DBI bit is held to the immediately previous value of the DBI bit to limit the total number of transitions on a data bus.

20 Claims, 6 Drawing Sheets

| Bit Time Interval | Data Pattern | | | | | | | | Transmitted | | | | | | | | DBI | No. transitions from Previous transmitted Bits to current untransmitted bits | Transitions on data bus |
|---|---|---|---|---|---|---|---|---|---|---|---|---|---|---|---|---|---|---|---|
| | 0 | 1 | 2 | 3 | 4 | 5 | 6 | 7 | 0 | 1 | 2 | 3 | 4 | 5 | 6 | 7 | | | |
| 1 | 1 | 0 | 1 | 0 | 0 | 1 | 1 | 1 | 1 | 0 | 1 | 0 | 0 | 1 | 1 | 1 | 0 | N/A | N/A |
| 2 | 0 | 1 | 0 | 1 | 0 | 1 | 0 | 0 | 1 | 0 | 1 | 0 | 1 | 0 | 1 | 1 | 1 | 6 | 3 |
| 3 | 1 | 0 | 0 | 0 | 0 | 1 | 0 | 1 | 0 | 1 | 1 | 1 | 1 | 0 | 1 | 0 | 1 | 4 | 4 |
| 4 | 1 | 0 | 1 | 0 | 0 | 1 | 1 | 0 | 0 | 0 | 0 | 1 | 1 | 0 | 0 | 1 | 1 | 4 | 4 |
| 5 | 0 | 1 | 1 | 1 | 0 | 0 | 0 | 1 | 0 | 0 | 0 | 1 | 0 | 0 | 0 | 1 | 0 | 2 | 3 |

SYSTEMS AND METHODS FOR TRANSITION-MINIMIZED DATA BUS INVERSION

TECHNICAL FIELD

This application relates to Data Bus Inversion (DBI), and more particularly, to systems and methods to minimize data transitions using DBI.

BACKGROUND

In single-ended parallel Input/Outputs (IOs) such as a Double Data Rate (DDR) transfer-mode bus, data bus inversion (DBI) is an increasingly popular coding scheme that reduces signaling power and simultaneous switching output (SSO) noise, thereby improving power and signal integrity. An example is an 8-bit data bus. In an 8-bit DBI-encoded data bus, the eight data bits are transmitted either as-is or inverted for each bit unit interval. At each bit unit interval, an extra coding overhead bit (also referred to as the DBI bit) accompanies the transmitted data bits to inform the receiver whether an intentional bus-wide inversion took place. For example, when the coding overhead bit is set to a logical one, it may indicate that the data bits of the bus are inverted. The receiver receives the data bits and the overhead bit, and if the overhead bit indicates that the data bits are inverted, the receiver may then revert the data bits to their proper values.

One example conventional DBI scheme, referred to as DBI-DC, is used where the receiver end is resistively terminated. In DBI-DC, the inversion criterion is to invert the bits of the bus when more than half of the bits of the parallel data pattern are binary ones (in a ground-terminated interface), thereby limiting the maximum number of transmitted ones to half of the data bus width. This reduces the static current and power delivered by the parallel transmitting drivers in a given bit time interval.

Another example conventional DBI scheme is referred to as DBI-AC. In a conventional DBI-AC scheme the receiver end is unterminated to avoid static power consumption, and the inversion criterion is to invert the bus when more than half of the parallel data pattern would undergo transitions (zero-to-one or one-to-zero) in progressing from the current bit time interval to the next. For example, if a unit interval would otherwise cause five data bit transitions, the DBI logic inverts the bus so as to cause only three data bit transitions.

This reduces the dynamic current and power consumed by the transmitting driver since data transitions consume power in an unterminated link. Moreover, a large number of bit transitions may cause a phenomenon referred to as "ground bounce" or "supply bounce," where the voltage supplied to a gate may temporarily dip and cause jitter. Conventional DBI-AC attempts to reduce ground bounce and supply bounce by reducing the number of transitions in a bit time interval.

In conventional DBI-AC, where N is an even integer number of data bits on a parallel bus, the maximum number of transitions permitted by conventional DBI is N/2+1 (where the "+1" refers to a possible transition of the DBI bit itself). In an example where the bus width is N=8 plus one DBI bit, the maximum number of transitions in the transmitted bus is limited by DBI to 4+1=5. There is still a need in the art for improved DBI-AC techniques.

SUMMARY

Circuits and methods for DBI-AC are provided. In one example, the immediately previous value of the DBI bit affects the next value of the DBI bit. Specifically, in some instances, the value of the DBI bit is held to the immediately previous value of the DBI bit to limit the total number of transitions on a data bus.

In order to further reduce a number of transitions, a proposed improvement to DBI includes taking the overhead DBI bit into account when determining whether or not to invert the bus. Various examples provided herein propose to hold a DBI value constant in some instances to limit the total number of bit transitions on a bus to N/2, where N is an integer number of the parallel data bits that comprise the bus. In one example, if the number of transitions of the data bits is equal to N/2, the DBI value is set to the immediately previous DBI value to avoid transitioning the DBI bit. The bits are then either inverted or not inverted according to the value of the DBI bit.

In some embodiments, a further aspect may include optimizing the above-presented technique to minimize 0→1 or 1→0 transitions depending on asymmetry in the ground (Vss) and supply (Vdd) power delivery networks (PDNs). In some systems, the quality of the Vdd PDN may be a concern, so there is a desire to minimize 0→1 transitions which pull current from the VDD PDN. A technique including such improvement would count a number of one type of transition (e.g., 0→1) and then hold the value of the DBI bit to prevent another such transition, when appropriate.

Various embodiments provide one or more advantages over conventional solutions. For instance, some embodiments improve upon the conventional DBI-AC scheme by additionally accounting for possible transitioning of the DBI bit. The result is the maximum number of transitions being no more than half of the data bus width. In an 8-bit data bus example, which is nine bits wide with the DBI bit, the maximum number of transitions with this improvement would be limited to four. This reflects a 20% maximum power reduction by virtue of limiting the maximum number of transitioning bits from five to four. Of course, the scope of embodiments is not limited to any particular number of bits in a bus. Such embodiments may further provide improved power integrity by reducing the current drawn from the supply or sent to ground

BRIEF DESCRIPTION OF THE DRAWINGS

FIG. 2 is a table of showing example bit transitions according to one embodiment with a data bus 8-bits wide.

DETAILED DESCRIPTION

Example Methods of Use

The inventors have observed that a problem with some conventional DBI-AC is that it does not account for transitions in the DBI bit itself. So for example, in an 8-bit data bus which is 9-bit wide including the DBI bit, the maximum number of transitions could actually be five (half of eight plus the DBI bit transition) in some conventional DBI-AC systems. By contrast, various embodiments limit the maximum number of transitions to N/2, which would be four transitions maximum on an 8-bit wide data bus.

Figure 1:
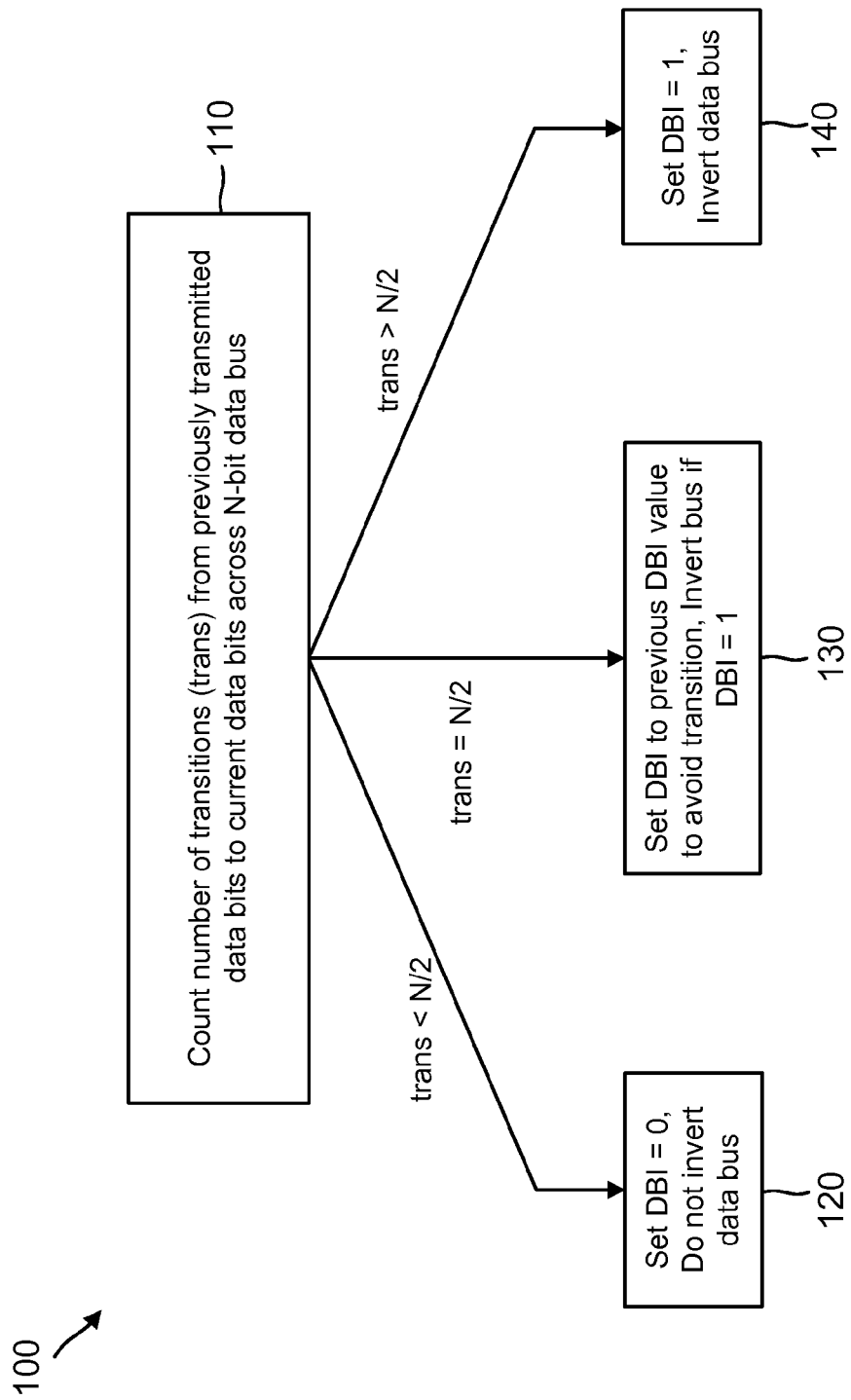
FIG. 1 is a flowchart of an example method according to one embodiment.
Figure 6:
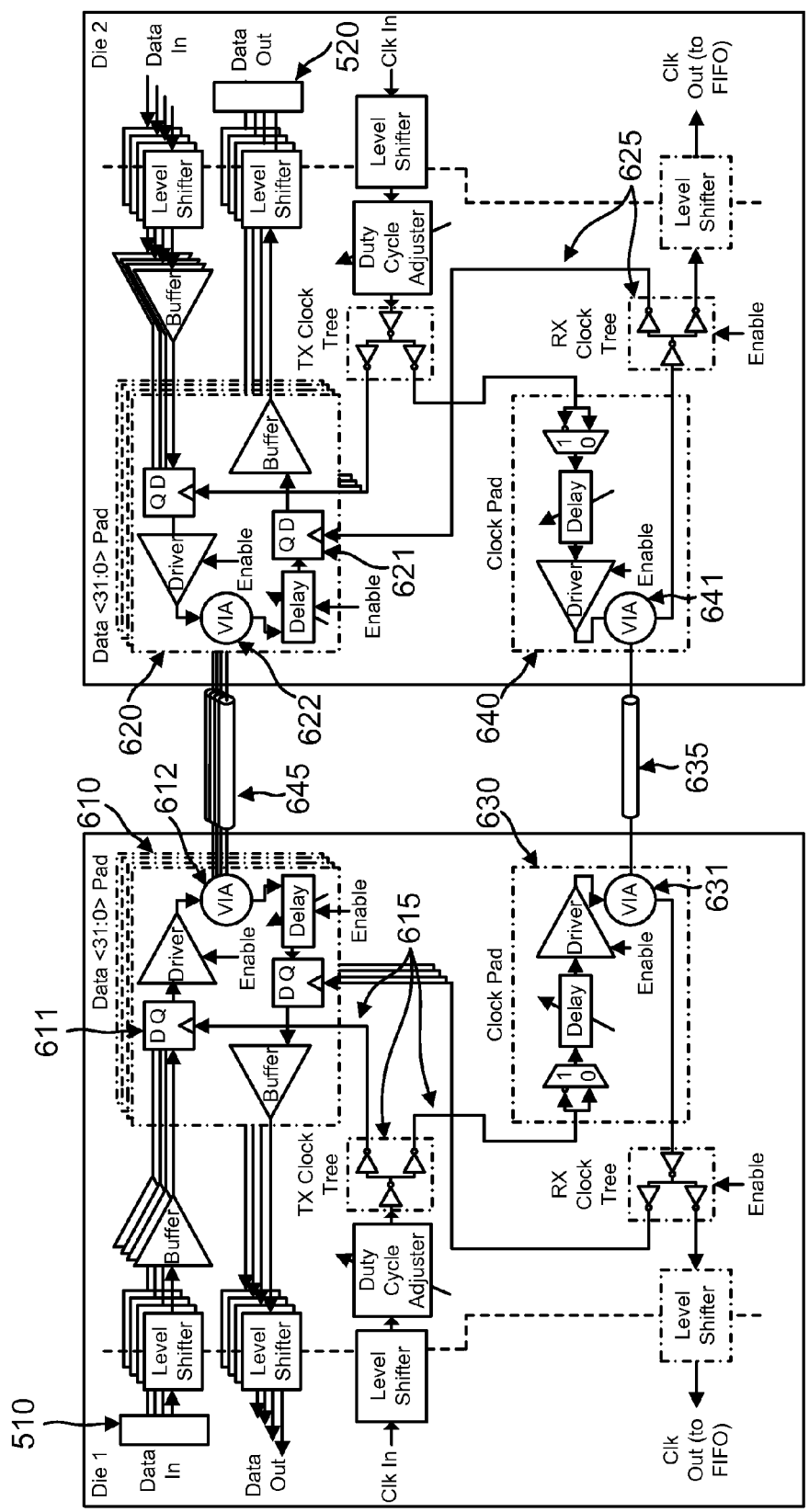
FIG. 6 shows a functional view of an example die-to-die interface, according to one embodiment of the present disclosure.

FIG. 1 is a flowchart of method 100 according to one example. Method 100 may be performed, for example, by an inversion logic circuit at a die-to-die parallel interface in which a data bus transmits bits of data from one die to another die. An example die-to-die interface is shown in FIG. 6, which is described in more detail below.

At action 110, the inversion logic circuit counts a number of transitions from previously-transmitted data bits to current (untransmitted) data bits across the N-bit data bus. In this example, a given bit transitions when the current value of the bit is different from the value of the bit that was previously transmitted. For instance, if a given bit was transmitted as a binary zero in the previous bit time interval, the inversion logic circuit counts a transition when it receives the bit as a binary one in the current bit time interval as part of the data pattern. So the bit transition that is counted at action 110 is a potential bit transition.

FIG. 2 is a table showing example bit transitions according to one embodiment with a data bus 8-bits wide. FIG. 2 includes a set of columns denoted as "data pattern," which shows the true bits as they are received by the inversion logic circuit. The set of columns denoted "transmitted pattern" show the bits as they are transmitted, either as-is or inverted. Bit transitions at action 110 are counted by comparing a bit time interval of the transmitted pattern columns to the immediately subsequent bit time interval in the data pattern columns on a bit-by-bit basis. The column labeled "No. Transitions from Previous Transmitted Bits to Current Untransmitted Bits" shows transitions counted at action 110 in this example.

An example bit transition according to action 110 is shown in FIG. 2 at bit time intervals 2 and 3. Specifically, data bit 2 was transmitted as a binary one at bit time interval 2 (Transmitted column) but is received as a binary zero at bit time interval 3 (Data Pattern column). It is counted as one transition at action 110. The transitions are counted bit-wise so that data bit 0 is compared to data bit 0, data bit 1 is compared to data bit 1, data bit 2 is compared to data bit 2, etc. Between bit time intervals 2 and 3, bits 4, 5, and 6 also count toward the number of transitions at action 110. Thus, from bit time interval 2 to bit time interval 3, the number of transitions counted is four.

Returning to FIG. 1, the number of transitions counted at action 110 is a deciding factor regarding which one of actions 120, 130, 140 is performed next. If the number of transitions at action 110 is smaller than N/2, then the method 100 proceeds to action 120. At action 120, the inversion logic sets the DBI bit to zero and does not invert the data bus.

It is noted in this example that a DBI bit set to zero indicates no inversion, whereas a DBI bit value of one indicates an inversion of the transmitted data on the data bus. However, in other embodiments, the relationship may be different such that zero indicates an inversion and one indicates no inversion.

If the number of transitions counted by the inversion logic at action 110 is greater than N/2, then the inversion logic sets the DBI bit value to one and inverts the data bus at action 140.

If the number of bit transitions counted by the inversion logic at action 110 is equal to N/2, then the DBI bit is set to its immediately previous value to avoid a transition of the DBI bit. Looking at the example of FIG. 2, from bit time interval 2 to bit time interval 3, the number of counted transitions is N/2 (four in this example); thus, the inversion logic progresses to action 130 of FIG. 1. In the example of FIG. 2, the value of the DBI bit at bit time interval 2 is one, so the inversion logic sets the DBI value to one at bit time interval 3. The inversion logic then inverts the data bits on the bus accordingly. Ovals in FIG. 2 show actual bit transitions occurring on the data bus between bit time intervals 2 and 3 according to the actions 110 and 140.

In an alternate example, had the value of the DBI bit been zero at bit time interval 2, then the inversion logic would have set the DBI bit to zero at bit time interval 3 after having counted N/2 bit transitions. A DBI value of zero in this example indicates that the data bits are put on the data bus as-is (not inverted).

When method 100 progresses to action 130, the inversion logic avoids transitioning the DBI bit, in contrast to conventional DBI-AC algorithms. Thus, in the example of FIGS. 1 and 2, the value of the DBI bit during a current bit time interval is dependent (at least in part) on the value of the DBI bit in the immediately previous bit time interval.

The scope of embodiments is not limited to the specific method shown in FIG. 1. Other embodiments may add, omit, rearrange, or modify one or more actions. In some examples, the method further includes transmitting the bits or the inverted bits on the data bus to a receiver. The receiver then either leaves the bits as-is or reverts the inverted bits depending upon the value of the DBI bit. Furthermore, in some examples, method 100 is repeated at each bit time interval millions or billions of times during operation of a computer processor. This is illustrated in part by FIG. 2, which shows five bit time intervals, though it is understood that the number of bit time intervals that can be performed by an inversion logic circuit is not limited to any number.

Figure 3:
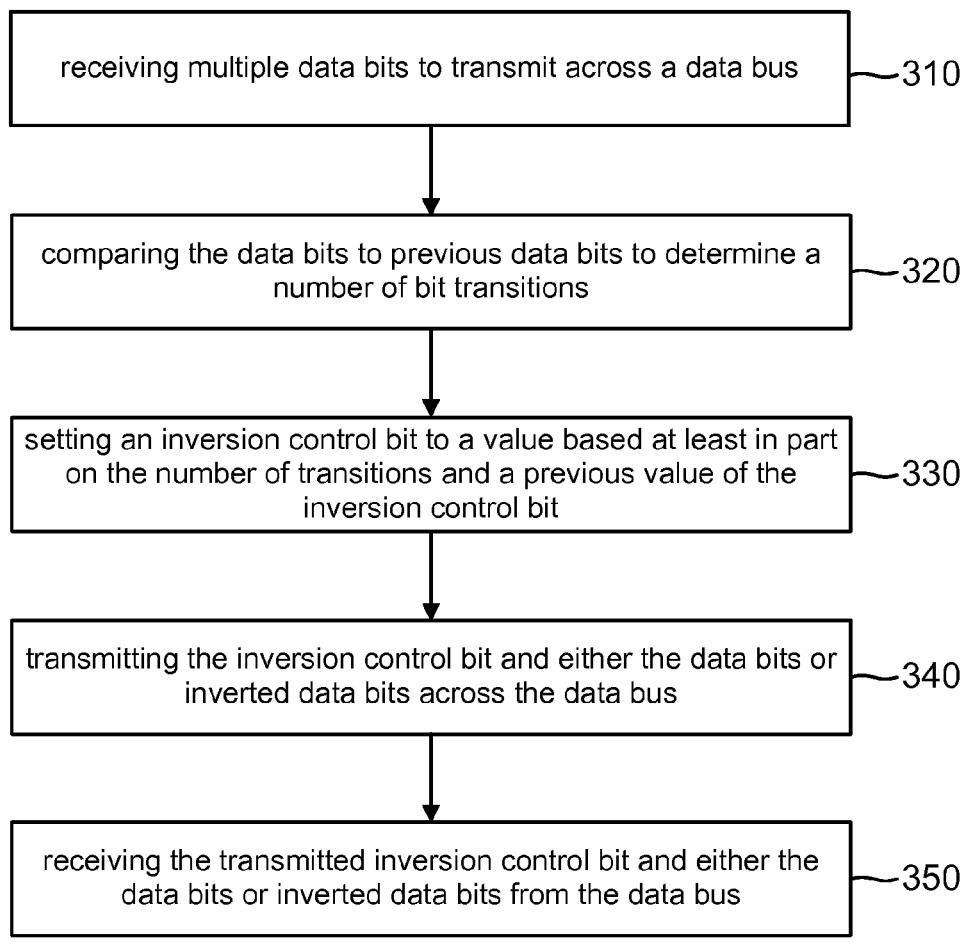
FIG. 3 is a flow diagram for an example method for performing data bus inversion, according to one embodiment.

FIG. 3 is a flow diagram for an example method 300 for performing data bus inversion, according to one embodiment. Method 300 may be performed by inversion logic circuits in communication with a data bus, as in the example of FIG. 5. In the particular example of FIG. 3, actions 310-340 may be performed by inversion logic at the transmitting side of the data bus, and action 350 may be performed by inversion logic at the receiving side of the data bus.

At action 310, the inversion logic circuit receives multiple data bits to transmit across a data bus. In some embodiments, the inversion logic circuit receives bits of data in parallel (e.g., eight bits or thirty-two bits).

At action 320, the inversion logic circuit compares the data bits to previous data bits to determine a number of bit transitions. For instance, in the embodiment of FIGS. 1 and 2, the inversion logic circuit compares the current received data bits to the bits that were transmitted in the immediately previous bit time interval. The bits that were transmitted in the immediately previous bit time interval may or may not have been inverted. Action 320 is similar to action 110 of FIG. 1 in that the number of bit transitions are potential bit transitions and may or may not be actual transitions on the data bus, depending on whether the data bits are eventually inverted in a subsequent action.

At action 330, the inversion logic circuit sets an inversion control bit to a value based at least in part on the number of transitions and a previous value of the inversion control bit. An example of an inversion control bit is the DBI bit of FIGS. 1 and 2.

The action 330 includes setting the inversion control bit to a value based on the number of transitions counted in action 320 and on the previous value of the inversion control bit. An example is shown at action 130 of FIG. 1 in which the inversion control bit value depends on both the number of counted transitions and on the previous value of the inversion control bit.

At action 340, the inversion logic circuit transmits the inversion control bit and either the data bits or inverted data bits across the data bus. For instance, if the inversion control bit is set to indicate an inversion, then the inversion logic circuit inverts the data bits before sending them across the data bus. On the other hand, if the inversion control bit is set to indicate no inversion, then the inversion logic circuit sends the data bits as-is across the data bus.

At action 350, an inversion logic circuit at the receiving end of the data bus receives the inversion control bit and the bits or inverted bits that were transmitted at action 340. The inversion control bit informs the receive-side circuitry whether the data bits are inverted. Action 350 may further include, in some embodiments, the inversion logic circuit at the receiving end determining that the inversion control bit indicates an inversion and reverting the inverted data bits in response to the inversion control bit.

On the other hand, action 350 may include the inversion logic circuit at the receiving end determining that the inversion control bit indicates no inversion and not inverting the data bits in response to the inversion control bit. In any event, the inversion logic circuit at the receive-side of the data bus receives the bits and either does or does not revert the bits depending upon the value of the received inversion control bit.

The scope of embodiments is not limited to the specific method shown in FIG. 3. As with the examples above, method 300 may be repeated at each bit time interval millions or billions of times during operation of a computer processor. It is understood that the number of bit time intervals that can be performed by an inversion logic circuit is not limited to any number.

Figure 4:
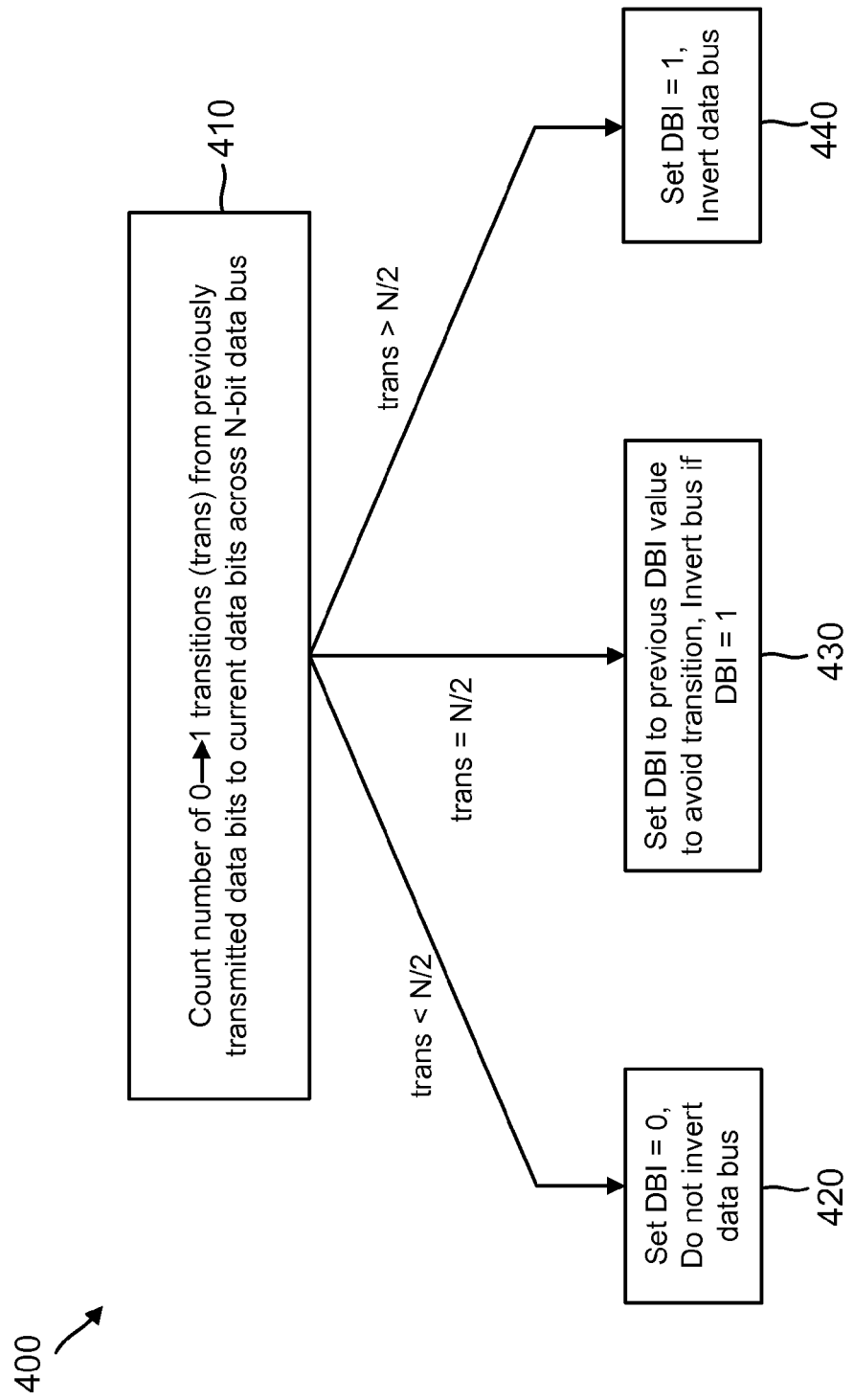
FIG. 4 is a flow diagram for an example method for performing data bus inversion, according to one embodiment.

Furthermore, some embodiments of method 300 may include performing actions in response to a polarity of particular bit transitions counted at action 320. FIG. 4 is a flow diagram for an example method 400 for performing data bus inversion, according to one embodiment. Method 400 may be performed by inversion logic circuitry, such as that illustrated in FIG. 5.

Action 410 is similar to action 110 of FIG. 1 but with the difference that action 410 counts only 0→1 transitions rather than the total number of transitions. Referring to FIG. 2, bit five transitions from zero to one between bit time intervals 2 and 3, though that is just an example of one such 0→1 transition. As with the examples above, bit transitions at action 410 are counted by comparing an immediately previous bit time interval of the transmitted pattern columns to the current bit time interval in the data pattern columns.

If the number of 0→1 transitions is less than N/2, then the inversion logic circuit progresses to action 420 by setting the DBI bit to indicate no inversion. The data are sent as-is across the data bus.

If the number of 0→1 transitions is greater than N/2, then the inversion logic circuit progresses to action 440 by setting the DBI bit to indicate an inversion. The data are then inverted and sent across the data bus.

However, if the number of 0→1 transitions is equal to N/2, then the inversion logic circuit sets the DBI bit to its immediately previous value at action 430. In another embodiment, action 430 includes setting the DBI bit to zero if its previous value was zero in order to avoid a 0→1 transitions of the DBI bit. The inversion circuit either inverts or does not invert the data (depending on the value of the DBI bit) and sends the data or inverted data across the data bus.

The embodiment of FIG. 4 addresses 0→1 transitions, though it is understood that the scope of embodiments is not so limited. Another embodiment counts the number of 1→0 transitions instead and then progresses to actions 420-440 accordingly to minimize a number of 1→0 transitions. The principles of FIG. 4 may be applied to transitions of either polarity. The embodiment of FIG. 4 attempts to minimize a number of transitions of a single polarity (either 0→1 or 1→0) rather than the total number of bit transitions at a bit time interval.

Such embodiments may be especially applicable to systems that have asymmetry in Vss and Vdd power delivery networks (PDNs). In some example systems, the Vdd PDN is more susceptible to voltage dips, so a DBI technique that minimizes 0→1 transitions may be more beneficial than a technique that minimizes a total number of transitions regardless of polarity.

In fact, some embodiments apply respective weights to 0→1 and 1→0 transitions. Returning to FIG. 1, the number of transitions at action 110 may be defined as W1 times the number of 0→1 transitions plus W2 times the number of 1→0 transitions, where W1 is a first weight and W2 is a second weight. Using this approach, when W1=1 and W2=1, the actions are the same as those described above with respect to the embodiment of FIG. 1 in which both transition types are counted equally. When W1=1 and W2=0, the actions follow those of the embodiment of FIG. 4 in which transitions from 0 to 1 are counted, but transitions from 1 to 0 are not counted. However, the scope of embodiments is not limited to weights being either 0 or 1 for a polarity of transition. In another example, W1 is greater than 0 but less than or equal to 1, and for W2 is also greater than 0 but less than or equal to 1, though W1 does not necessarily equal W2. Thus, if a Vdd PDN is more susceptible to voltage dips, W1 may be set higher than W2. And if a Vss PDN is more susceptible to voltage fluctuation, then W2 may be set higher than W1.

Various embodiments may provide one or more advantages over conventional DBI-AC techniques. For instance, embodiments limiting a total number of transitions may provide for a total power reduction commensurate with limiting transitions to a maximum of N/2 at a given bit interval. Reducing transitions may also reduce noise jitter and enable a higher data rate in some systems. Also, as noted above, some embodiments may be optimized to minimize transitions of a single polarity and may provide reduced jitter in systems with asymmetric PDNs.

Example Circuit Embodiments

Figure 5:
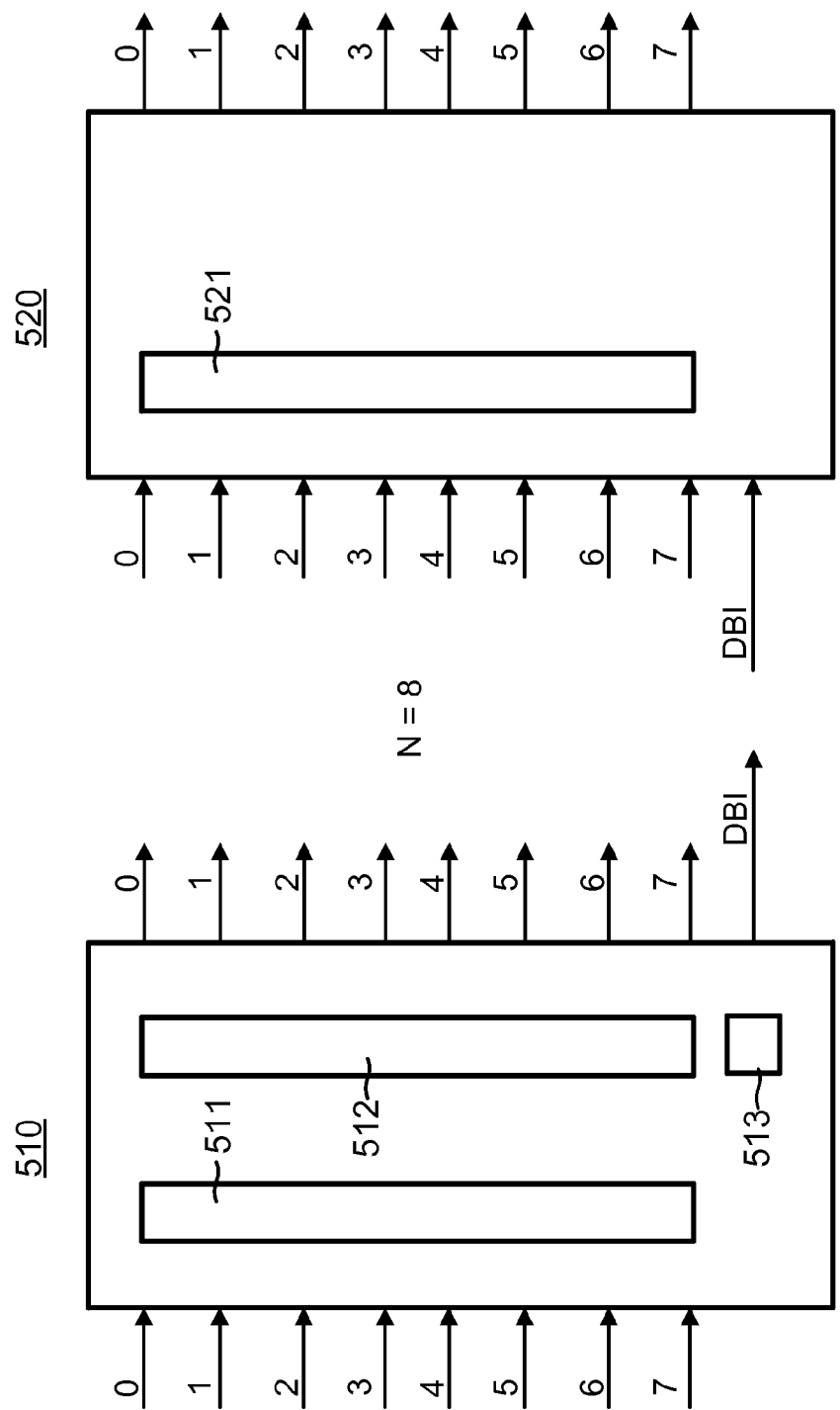
FIG. 5 shows example inversion logic circuits according to one embodiment.

FIG. 5 shows example inversion logic circuits 510 and 520 according to one embodiment. Inversion logic circuits 510 and 520 are shown with eight bits, through it is understood that the scope of embodiments may include inversion logic circuits adapted to employ any appropriate number of bits. For instance, in the embodiment of FIG. 6 (described below), inversion logic circuits 510 and 520 would employ thirty-two data bits as well as the DBI bit. Inversion circuit 510 may be included in a transmit path, whereas inversion circuit 520 may be included in a receive path.

Inversion logic circuit 510 includes on the left-hand side eight data bit inputs 0-7 and on the right-hand side eight data bit outputs 0-7 and a DBI bit output. Comparing logic 511 is employed to perform actions 110 and 410 (of FIGS. 1 and 4, respectively) to compare currently-received bits to previously-transmitted bits and identify a number of transitions. For instance, the bits may be received (as at action 310 of FIG. 3) at the inputs 0-7 on the left-hand side of circuit 510. Comparing logic 511 then determines a number of transitions.

Inversion logic circuit 510 also includes DBI selection circuitry 513 to set the DBI bit according to actions 120-140 and 410-440 of FIGS. 1 and 4, respectively. Thus, circuitry 513 can set the DBI bit to indicate inversion, to indicate no inversion, or to an immediately previous value of the DBI bit as appropriate. An example is described above with respect to action 330 of FIG. 3. Inversion logic circuit 510 also includes a bank of inverters 512 to invert the data bits when the DBI bit indicates inversion. Inverters 512 may be bypassed when the DBI bit indicates no inversion. Circuit 510 outputs either the bits or inverted bits at the outputs 0-7 on the right-hand side.

Although not shown herein, inversion logic circuits 510 and 520 may be coupled to each other through a data bus. Inversion logic circuit 520 receives the data bits and the DBI bit at its inputs on the left-hand side. If the DBI bit indicates inversion, then inverters 521 revert the inverted bits. If the DBI indicates no inversion, then inverters 521 may be bypassed. Inversion logic circuit 520 outputs the data bits to downstream circuitry (not shown) at its data outputs on the right-hand side. In this example, the data bits output at the right-hand side of circuit 520 are the same data bits received at the left-hand side inputs of circuit 510.

One particular application of the example embodiments is at a die-to-die interface in a multi-die package. An example of a multi-die package includes a computer processor that has multiple processing components implemented as separate die. The die communicate with each other over a data bus, and one die may also forward a clock to the other die, as explained in more detail below with respect to FIG. 6. The scope of embodiments includes applying the principles described above to any appropriate system using a parallel interface and may include parallel interface applications other than at die-to-die interfaces.

FIG. 6 shows a functional view of an example die-to-die interface, according to one embodiment of the present disclosure. The die-to-die interface of FIG. 6 is part of a multi-die computer processor. FIG. 6 is provided to show how inversion logic circuits, such as circuits 510 and 520, may be disposed in a multi-die package having die 1 and die 2. In this example, die 1 includes inversion logic circuit 510 and die 2 includes inversion logic circuit 520, where both circuits 510 and 520 handle thirty-two bits of data (i.e., N=32).

Die 1 includes data pads 610 and a clock pad 630. In this example, data pads 610 includes thirty-two data pads (<31:0>) and may be arranged, e.g., in a four-by-eight grid of nodes. Each of the thirty-two data pads may be associated with a particular bit of data on a thirty-two bit-wide data bus. The scope of embodiments is not limited to any specific data bus width.

In this example, die 1 transmits data and clock signals to die 2 during mission mode as follows. Clock pad 630 is used to forward the clock from die 1 to die 2. In this example, the clock reaches via 631, which is externally exposed at die 1 and propagates over clock route 635 to via 641 at clock pad 640. Thus, the data is accompanied by a forwarded clock in the embodiment of FIG. 6.

Die 1 includes transmit clock tree 615, which is shown conceptually in FIG. 6. Transmit clock tree 615 includes buffers to receive the clock (from Clk in), metal routes to data pads 610, and a metal route to clock pad 630. During mission mode, transmit clock tree 615 communicates the clock signal to die 2 by way of via 631 and clock path 635.

Focusing on die 2 during mission mode, receive clock tree 625 includes buffers to receive the clock from clock pad 640 and metal routes to distribute the clock to data pads 620. Data pads 620 include thirty-two nodes in this example, where each of the nodes corresponds to one of the nodes of data pads 610. In some examples, data nodes 610 and 620 are arranged in a spatial pattern such that a pair of corresponding nodes (one a transmit node and one a receive node) are similarly placed upon their respective die. Thus, each of the thirty-two data forwarding routes 645 may be uniform in length (and match a length of clock forwarding route 635). In fact, die 1 and die 2 are similar to each other in makeup in this example.

Returning to die 1, during mission mode the clock is distributed by transmit clock tree 615 to the thirty-two data pads 610. Each data pad 610 in this example includes a flip-flop 611, which is storing data. When a given flip-flop 611 receives the clock edge it forwards the data to its respective via 612. The data is then transported on a respective data forwarding route 645 to its corresponding node within data pads 620. Both the data and the clock are sent from die 1 to die 2 in this mission mode example, so the clock signal is also passed from transmit clock tree 615 to via 631, clock path 635, via 641 (at clock pad 640), receive clock tree 625, and to respective flip-flops 621. The data is received by a respective via 622 and is captured by its respective flip-flop 621 at the clock edge.

Die 1 includes inversion logic circuit 510 at DATA IN before transmit flip-flops 611. Thus, during those bit time intervals in which the data is inverted, it is inverted before it reaches flip-flops 611. The data bits (whether inverted or not) are sent from die 1 to die 2 over the N-bit data bus shown as routes 145. Although not explicitly shown herein, the DBI bit is also latched and forwarded from die 1 to die 2 and then captured at die 2 and passed on to circuit 520 with the data bits. In those data bit intervals in which the data bits are inverted, inversion logic circuit 520 reverts the data bits as appropriate before sending the data to DATA OUT.

The examples of FIGS. 5 and 6 above are provided for illustrative purposes, and it is understood that the scope of embodiments is not limited to the specific embodiments shown above. For instance, a die may have any appropriate number of bits (whether thirty-two, fifty, or another number). Also, the flip-flops at the nodes may operate on either a rising or falling clock edge, as appropriate. Furthermore, while FIGS. 5 and 6 shows flip-flops to capture data, any appropriate sequential logic circuit may be used in various embodiments.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method comprising:
   receiving a plurality of data bits to transmit across a data bus;
   comparing the plurality of data bits to a previous plurality of data bits to determine a number of bit transitions from the previous plurality of data bits to the plurality of data bits;
   setting an inversion control bit to a value based at least in part on the number of bit transitions and a previous value of the inversion control bit; and
   transmitting the inversion control bit and either the plurality of data bits or an inverse of the plurality of data bits across the data bus.

2. The method of claim 1, further comprising:
inverting the plurality of data bits in response to determining that the number of bit transitions is N/2, where N is an integer number of the plurality of data bits, and in response to determining that the previous value of the inversion control bit indicates an inversion.

3. The method of claim 1, further comprising:
not inverting the plurality of data bits in response to determining that the number of bit transitions is N/2, where N is an integer number of the data bits, and in response to determining that the previous value of the inversion control bit indicates no inversion.

4. The method of claim 1, further comprising:
receiving the transmitted inversion control bit and either the plurality of data bits or the inverse of the plurality of data bits from the data bus.

5. The method of claim 1, wherein the previous plurality of data bits is one bit time earlier than the plurality of data bits.

6. The method of claim 1 in which comparing the plurality of data bits to a previous plurality of data bits comprises:
comparing individual data bits of the plurality of data bits bit-wise with individual bits of the previous plurality of data bits.

7. The method of claim 1, wherein comparing the plurality of data bits to the previous plurality of data bits to determine the number of bit transitions comprises:
adding a number of zero-to-one bit transitions times a first weight to a number of one-to-zero bit transitions time a second weight to calculate the number of bit transitions.

8. The method of claim 1, further comprising:
transmitting a forwarded clock concurrently with transmitting the inversion control bit and either the plurality of data bits or the inverse of the plurality of data bits across the data bus.

9. The method of claim 1, wherein comparing the plurality of data bits to a previous plurality of data bits comprises:
determining a number of zero-to-one bit transitions between the previous plurality of data bits and the plurality of data bits;
further wherein setting the inversion control bit comprises:
setting the inversion control bit to a value based at least in part on the number of zero-to-one bit transitions and the previous value of the inversion control bit.

10. The method of claim 1, wherein comparing the plurality of data bits to a previous plurality of data bits comprises:
determining a number of one-to-zero bit transitions between the previous plurality of data bits and the plurality of data bits;
further wherein setting the inversion control bit comprises:
setting the inversion control bit to a value based at least in part on the number of one-to-zero bit transitions and the previous value of the inversion control bit.

11. A computer processor including a semiconductor die, the computer processor comprising:
a multiple-bit-wide output to a data bus; and
an inversion logic circuit in communication with the multiple-bit-wide output to the data bus, the circuit adapted to perform the following operation:
setting an inversion control bit to a value based at least in part on a previous value of the inversion control bit; and
transmitting the inversion control bit and either a plurality of data bits or an inversion of the plurality of data bits across the data bus in accordance with the value of the inversion control bit.

12. The computer processor of claim 11, further comprising:
another semiconductor die adapted to receive the inversion control bit and the plurality of data bits or the inversion of the plurality of data bits from the data bus.

13. The computer processor of claim 11, wherein the circuit is further adapted to perform:
comparing the plurality of data bits to a previous plurality of data bits to determine a number of bit transitions, wherein the previous plurality of data bits is one bit time earlier than the plurality of data bits; and
setting the inversion control bit to the value based at least in part on the number of bit transitions.

14. The computer processor of claim 11, wherein setting the inversion control bit comprises:
setting the inversion control bit to its immediately previous value in response to determining that the number of data bit transitions is N/2, where N is an integer number of the data bits.

15. A method comprising:
receiving N data bits at an inversion logic module, where N is a positive integer corresponding to a data bit width of a data bus;
comparing the N data bits to a previous N data bits to determine a number of bit transitions;
setting a data bus inversion (DBI) control bit to a value determined by its immediately previous value in response to determining that the number of bit transitions equals N/2; and
transmitting the following items across data bus:
the DBI control bit; and
either the N data bits or an inversion of the N data bits.

16. The method of claim 15, further comprising:
inverting the N data bits in response to determining that the number of bit transitions is N/2, and in response to determining that the immediate previous value of the DBI control bit indicates an inversion.

17. The method of claim 15, further comprising:
not inverting the N data bits in response to determining that the number of bit transitions is N/2, and in response to determining that the immediate previous value of the DBI control bit indicates no inversion.

18. The method of claim 15, wherein comparing the N data bits to the previous N data bits comprises:
determining a number of zero-to-one bit transitions;
further wherein setting the DBI control bit comprises:
setting the DBI control bit to a value based at least in part on the number of zero-to-one bit transitions and the previous value of the DBI control bit.

19. The method of claim 15, wherein comparing the N data bits to the previous N data bits comprises:
determining a number of one-to-zero bit transitions;
further wherein setting the DBI control bit comprises:
setting the DBI control bit to a value based at least in part on the number of one-to-zero bit transitions and the previous value of the DBI control bit.

20. The method of claim 15, wherein the previous N data bits are one bit time earlier than the N data bits, further in which comparing the N data bits to the previous N data bits comprises a bit-wise comparison.

* * * * *